United States Patent [19]
Couillard

[11] Patent Number: 5,639,339
[45] Date of Patent: Jun. 17, 1997

[54] LAMINATING MACHINE

[75] Inventor: Cal Couillard, Deerfield, Wis.

[73] Assignee: Seal Products Incorporated, Naugatuck, Conn.

[21] Appl. No.: 282,165

[22] Filed: Jul. 28, 1994

Related U.S. Application Data

[62] Division of Ser. No. 984,853, Dec. 3, 1992, abandoned.

[51] Int. Cl.[6] .................................................. B32B 31/04
[52] U.S. Cl. ......................... 156/555; 156/580; 492/54; 464/183
[58] Field of Search ........................... 156/555, 583.1, 156/580; 492/40, 54, 58; 464/183

[56] References Cited

U.S. PATENT DOCUMENTS

| | | | |
|---|---|---|---|
| 1,844,231 | 2/1932 | Sipe et al. | 464/183 X |
| 2,895,508 | 7/1959 | Drake | 165/183 X |
| 3,027,285 | 3/1962 | Eisner et al. | 156/359 |
| 3,421,966 | 1/1969 | McLaughlin | 156/555 |
| 3,453,169 | 7/1969 | Buck et al. | 156/555 X |
| 3,797,341 | 3/1974 | Bystron | 269/21 X |
| 3,840,420 | 10/1974 | Sarcia | 156/358 |
| 3,901,758 | 8/1975 | Humphries | 156/499 |
| 3,954,368 | 5/1976 | Kawakami | 156/285 |
| 4,416,719 | 11/1983 | Horiuchi | 156/359 |
| 4,498,941 | 2/1985 | Goldsworthy | 156/148 |
| 4,619,728 | 10/1986 | Brink | 156/555 |
| 4,743,334 | 5/1988 | Singer | 156/499 |
| 4,781,795 | 11/1988 | Miller | 162/359 |
| 5,032,035 | 7/1991 | Inabata | 492/40 X |
| 5,232,538 | 8/1993 | Liu | 156/359 |
| 5,393,959 | 2/1995 | Kitano et al. | 219/619 |

Primary Examiner—James Sells
Attorney, Agent, or Firm—Synnestvedt & Lechner

[57] ABSTRACT

A laminating machine has first and second parallel horizontally oriented heated rolls, the first roll positioned below the second roll, and the second roll movable vertically relative to the first roll. There is also provided a pair of pull rollers positioned at the back of the machine for drawing laminating material through the machine. A substantially hollow horizontal work table having a plurality of perforations in the top thereof and a fan at the bottom thereof is positioned at the front of the machine. The fan draws air through the perforations in the top of the table to create a vacuum and retain material against the table as it is fed into the machine. The second work table is positioned at the back of the machine adjacent the pull rollers. The machine further has dual controls such that it may be operated from the front or the back thereof, and a plurality of turn off switches such that the heating elements and motor may be turned off, and the first and second rollers separated upon contact with any one of the switches.

6 Claims, 8 Drawing Sheets

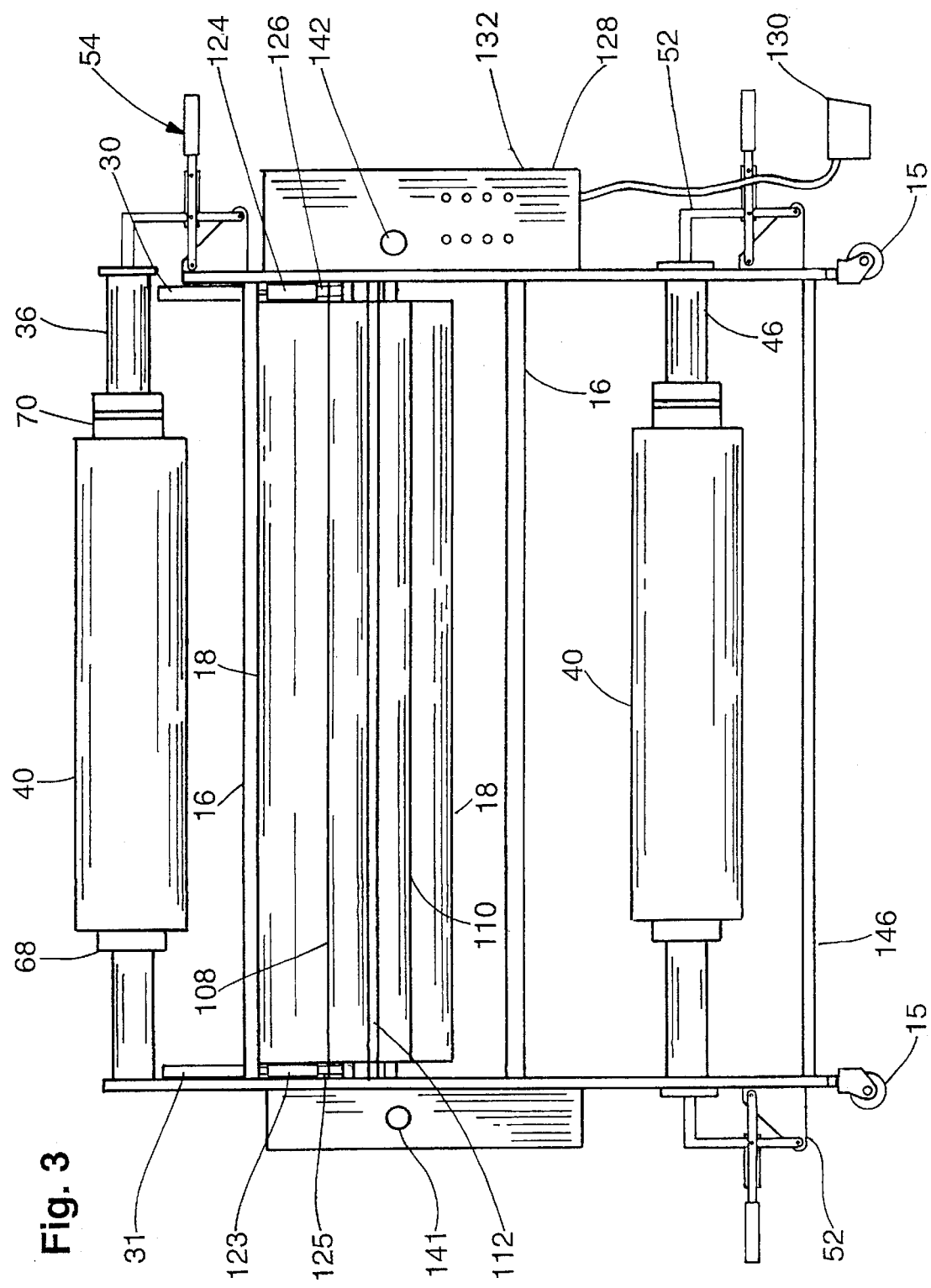

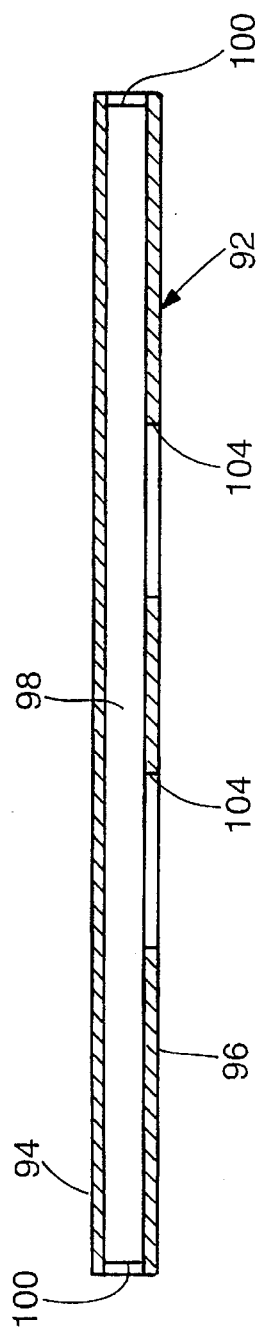
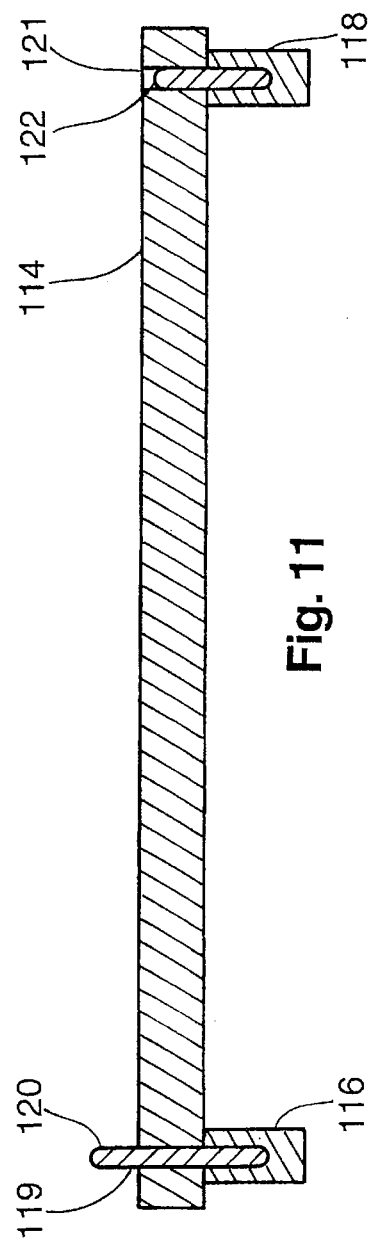
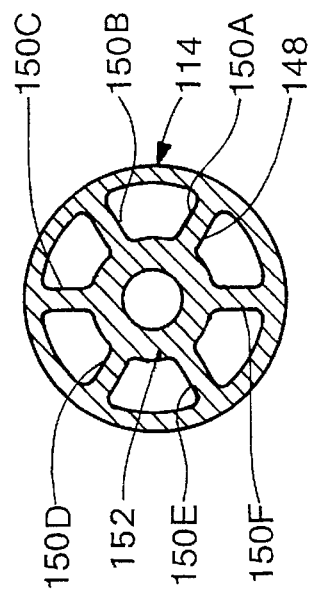
Fig. 10
Fig. 11
Fig. 12

LAMINATING MACHINE

This is a divisional of application Ser. No. 07/984,853 filed on Dec. 3, 1992, abandoned.

The present invention relates to laminating machines and in particular to large laminating machines which can use laminating material taken from any one of a plurality of rolls of material and can be operated from the front or the back of the machine.

BACKGROUND OF THE INVENTION

Laminating machines apply a film of transparent flexible plastic material to a print so as to provide a protective surface to the print. On some occasions it is necessary to apply a laminating material to only one surface of a print, but in other circumstances it is desirable to apply a laminating material to both the upper and lower surfaces of a print and encapsulate the printed material between the lamination. In other cases, it is desirable to apply a laminating material to the upper surface of a print and attach the lower surface of a print to a mounting board. It is therefore desirable to provide a laminating machine which can be used to perform all of the above functions.

Print material is available in large rolls of paper, or the like, which may be used, for example, to make a long sign. In such cases it is desirable to apply a lamination to one or both sides of print material which is available on a roll. Present laminating machines require that the print material be sliced into manageable sections and each section fed into a laminating machine for lamination. It would be desirable to provide a laminating machine which could accept an entire roll of print material and feed one end of the roll into the laminating machine and laminate the roll of print material in a continuous operation. It is also desirable to have a laminating machine which retains a second, back-up roll of laminating film which can be fed into the machine with little or no interruption of the operation thereof when the first roll of laminating material is exhausted.

There are two types of laminating material currently available, one of which is pressure sensitive, and the other of which is heat activated. The pressure sensitive laminating material has an adhesive on one side thereof and is applied to print material by using parallel rollers to compress the adhesive side of the laminating material against the print. Pressure sensitive laminating material is more expensive than heat activated laminating material, and pressure sensitive laminating material does not bond directly to the print material. Print material to which a pressure sensitive laminating material has been applied, cannot be easily rolled onto a spool.

Heat activated laminating material, on the other hand, has an adhesive chemical which becomes activated at temperatures of approximately 200° F. Laminator which are adapted to apply heat activated laminating material have a heated roller which maintains a temperature which will activate the adhesive chemicals of the laminating material and apply it to the print material. An operator of the laminating machine may become injured during the course of operation if his hand becomes pinched between the rollers of the machine, and if a heat activated laminated material is being applied, the operator may also suffer burns. It would be desirable, therefore, to provide a laminating machine which can perform a wide variety of functions, and have safety features to release the pressure between the rollers and turn off the heating elements to prevent or minimize injury to an operator.

Currently existing laminating machines have temperature sensing devices which contact the heated roller to determine the temperature of the roller. Such temperature sensing devices may not accurately assess the temperature of the work surface of the roller, and as a result, either too much or too little heat may be applied to the laminating material. Too little heat may fail to activate the adhesive chemicals and as a result the laminating material may not adhere to the surface of the print. Too much heat may result in the destruction of the laminating material before it is applied to the print. It is, therefore, necessary that the temperature of the roller be accurately maintained across the work surface thereof.

Another problem experienced by existing machines is that print material frequently has curled edges, or has irregularities in its surface such that it is difficult to feed the print material into the machine without causing wrinkles which will become laminated into the print. It would be desirable to provide a means for drawing the print material evenly across the feed table of the laminating machine so as to avoid curling, wrinkling or folding.

When a laminating machine is to be used to laminate a lengthy roll of print material, the machine must evenly draw material off an input roll of print without causing wrinkles or imperfections and will remain aligned with the laminating material as it is applied to the print.

It is further desirable to provide a laminating machine which can overcome all the foregoing problems and will apply both pressure sensitive and heat activated laminating material, and yet not be excessively large and heavy. It is the intent of the present invention to overcome the problems encountered with existing laminating machines.

SUMMARY OF THE INVENTION

Briefly, a laminating machine in accordance with the present invention has two parallel horizontally oriented heated rollers, a first roller positioned below a second roller, and the second roller movable vertically relative to the first roller. The second roller can be compressed against the first roller during a laminating process, or the second roller may be raised above the first roller. The machine has a front, and material to be laminated is inserted along a table positioned across the front of the machine between the nip of the first and second rollers for lamination. The machine further has two end panels and a back, and has a pair of parallel horizontally oriented pull rollers across the back thereof for pulling laminated material through the machine.

One feature of the present invention is a plurality of cantilever mounted unwind shafts, each cantilever unwind shaft adapted to receive a roll of laminating material. A plurality of cantilever mounted unwind shafts are positioned above the second heated roller, and a second plurality of cantilever mounted unwind shafts are positioned below the first heated roller. Accordingly, the laminating machine may apply a laminating material both above and below a print which is fed into the nip between the first and second rollers. Upon the exhaustion of all the material on a spool about one of the cantilever unwind shafts material from a spool of laminating material fitted on an adjacent cantilever mounted unwind shaft can be fed into the machine with little or no down time. Spools of laminating material may be easily loaded or unloaded from such cantilever mounted shafts.

Another feature of the present invention is that the unwind shafts, and other tubular members of the machine are extruded of aluminum such that they have hollow interiors except for a reinforcing webbing for retaining structural strength in the shaft. Another feature of the present invention is a brake which can be positioned on a cantilever unwind shaft to apply pressure to one end of a roll of laminating material so as to prevent free rotation of the roll. The brake further includes a threaded sleeve which is clamped around the shaft and over which a complementary threaded collar is fitted. Rotation of the collar causes axial movement of a brake collar at the distal end thereof. When a roll of laminating material is retained from axial movement by a clamp on the shaft, and a brake is fitted against the opposing edge of the spool, the brake causes resistance to rotation of the spool and the laminating material may be evenly withdrawn from the spool by drawing upon the free end thereof.

Another feature of the present invention is a substantially hollow horizontal work table positioned parallel with the nip at the front of the machine. A plurality of perforations are provided in the upper portion of the table and a fan is positioned adjacent a hole in the bottom portion of the work table. The fan is oriented to draw air through the perforated holes in the top through the open center of the work table and out the hole in the bottom thereof. Print material to be laminated positioned on the table will therefore be drawn by a vacuum against a surface of the table and fed linearly onto the nip of the rollers.

Another feature of the present invention is the provision of an easel shaft positioned across the table at the front of the machine. The easel shaft is cantilevered mounted parallel to the first and second rollers and adapted to retain a roller of print material which can be fed across the vacuum table and into the nip of the machine. The cantilever mounting of the easel shaft is adapted to rotate about a vertical axis to facilitate the installation and removal of a roll of print material onto the shaft.

Another feature of the present invention is the provision of dual operating controls, one set of controls for operation of the machine from the front thereof, and a second set of controls for operating the machine from the back thereof. The machine further has a plurality of pressure sensitive turn off switches, and the activation of any turn of switch will turn off the heating elements for the first and second rollers, turn off rotational power directed to the rollers, and cause the first roller to be moved away from the second roller. One pressure sensitive turn off switch is positioned at each end of the front of the machine and one pressure sensitive turn off switch is positioned at each end of the back of the machine. Furthermore, a pressure sensitive turn off switch is positioned along the bottom of the machine at the front thereof and another pressure sensitive turn off switch is positioned on the bottom of the machine at the back thereof. In the event an operator becomes caught in the machine, the motor of the machine will be turned off, the first and second rollers and the upper and lower pull rollers will all be separated, and the heating elements in the first and second rollers will be turned off upon the actuation of any of the pressure sensitive switches. An operator may press a pressure sensitive switch with either hand, or with a foot from any work position around the machine.

A second work table is positioned at the back of the machine and the machine is adapted to be run in reverse. Accordingly, an operator who is using the machine to apply a heat laminating material may use the rear table and pull rollers to compress a portion of pressure sensitive laminating material to a work piece, or use the pull rollers and rear work table for compressing print material to a mounting board. These functions can be carried out from the rear work table using the pull rollers without waiting for the first and second heated rollers to cool to room temperature to undertake the same task.

The present invention further includes infrared heat sensing devices which sense the temperature of the first and second heat rollers and provide a read out of the temperature and regulate the heating elements which are positioned inside the shafts of the first and second rollers. Such infrared heat sensing devices assess the temperature of the rollers over the working area so as to insure that the temperature thereof is properly maintained.

BRIEF DESCRIPTION OF THE DRAWING

A better understanding of the present invention can be had by a reading of the following detailed description taken in accompaniment with the attached drawings in which:

FIG. 3 is a back elevational view of the laminating machine shown in FIG. 1;

FIG. 10 is a cross sectional view of the table shown in FIG. 8 taken through lines 10—10 thereof;

FIG. 11 is a cross sectional view of an easel shaft fitted on pegs at the distal ends of arms extending from the machine shown in FIG. 1;

FIG. 12 is an enlarged end view of the easel shaft for the machine in FIG. 1.

DETAILED DESCRIPTION OF A PREFERRED EMBODIMENT

Figure 1:
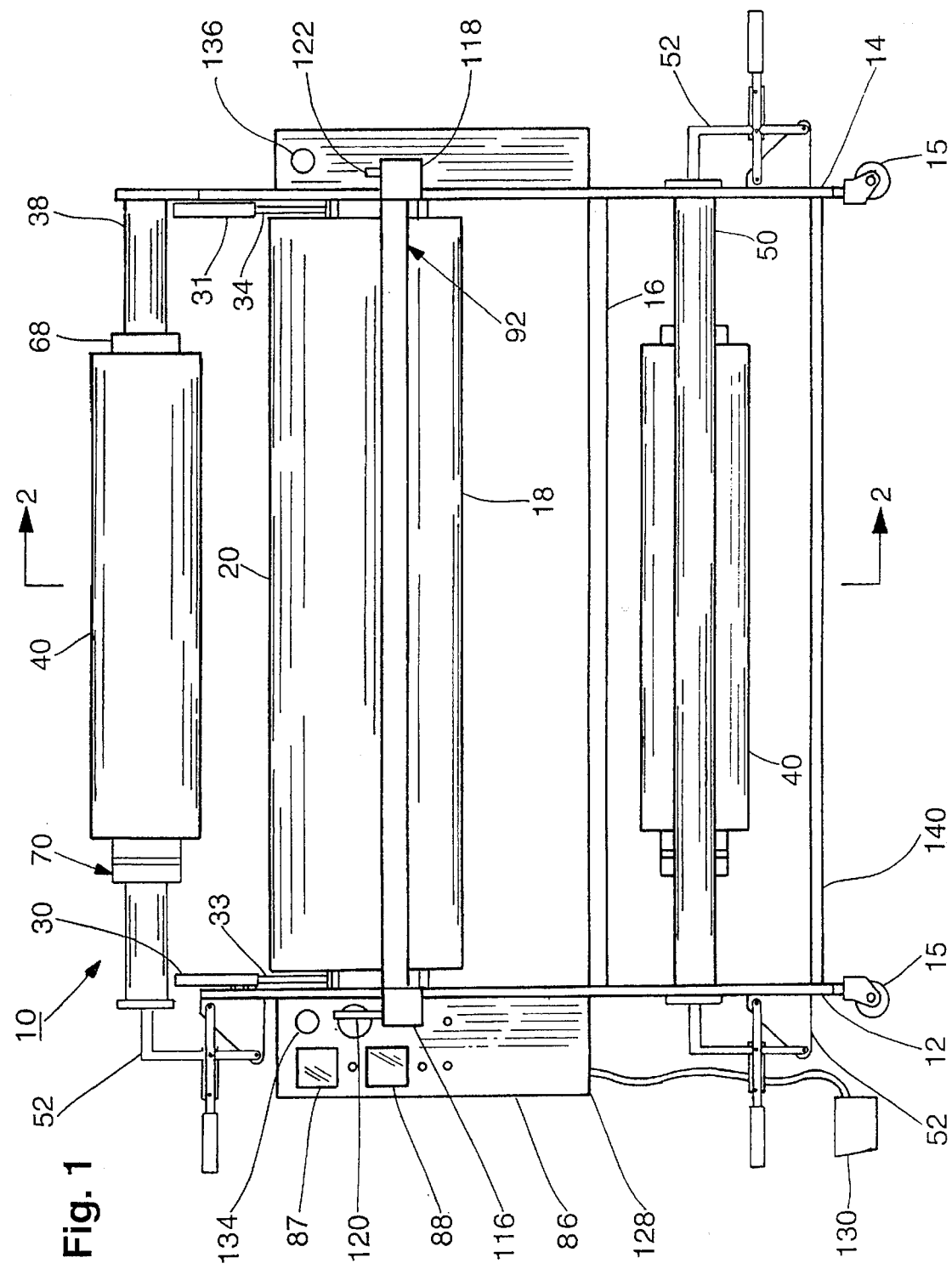
FIG. 1 is a plan front elevational view of a laminating machine in accordance with the present invention.
Figure 2:
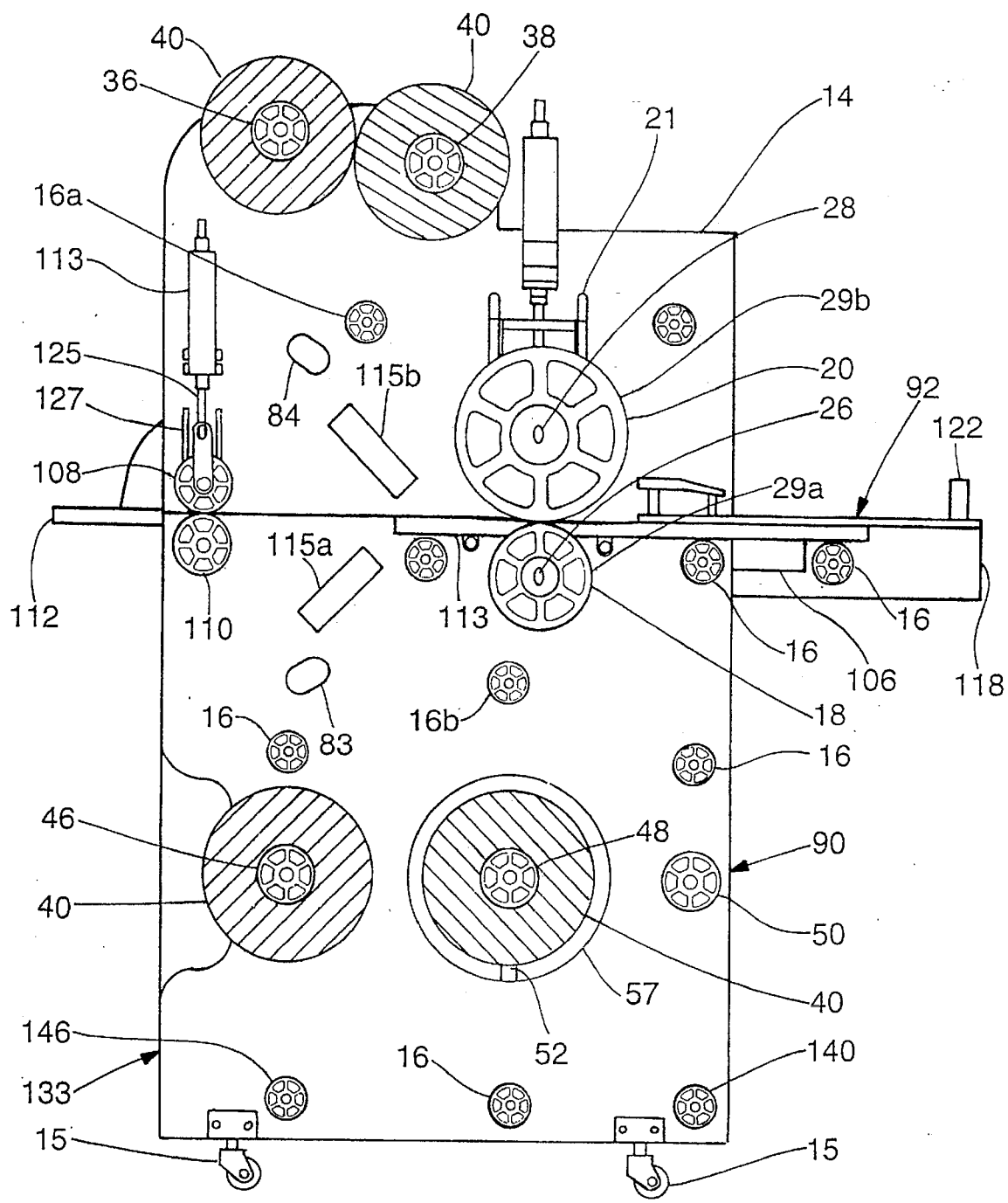
FIG. 2 is a cross sectional view of the laminating machine shown in FIG. 1 taken through lines 2—2 thereof.

Referring to FIGS. 1, 2 and 3, a laminating machined 10 has first and second end members 12, 14, respectively, which have casters 15 at the bottom thereof and the end members 12, 14 are retained in spacial relationship by a plurality of cylindrical tie bars 16—16. Centrally located in the machine 10 is a transverse first heated roller 18, and parallel to the first heated roller 18 and positioned directly thereabove is a second heated roller 20. Each of the heated rollers 18, 20 have tubular bodies into which are fitted elongate quartz heating elements 26, 28. Around the outer surfaces of the tubular bodies of the heated rollers 18, 20 is a ⅛ to ⅜ inch thick layer of silicon material 29a, 29b.

The outer ends of the second heated roller 20 are fitted into vertically oriented longitudinal tracks, one of which, 21, is shown, such that the second heated roller 20 can be moved upward and downward toward or away from the first heated roller 18. The outer ends of the second heated roller 20 are moved by a first and second cylinders 30, 31 from which associated rods 33, 34 extend, one at each end of the second heated roller 20, and each cylinder 30, 31 is actuated by compressed air. When the rods 33, 34 of the cylinders 30, 31 are in the retracted position, the second heated roller 20 will be positioned several inches above the first heated roller 18. When the rods 33, 34 of the cylinders 30, 31 are extended, the second heated roller 20 will be compressed against the first heated roller 18 such that print material and a laminating film fed into the nip between the first and second rollers 18, 20 will be subjected to pressure as a result thereof.

Extending horizontally from a point adjacent the top of the second end member 14 are parallel cantilever mounted unwind shafts 36, 38 which are depicted as each having a spool of laminating material 40 fitted thereon. Along the bottom of the machine 10 are three parallel cantilever unwind shafts 46, 48, 50, each of which is identical to the upper unwind shafts 36, 38. Of the lower unwind shafts 46, 48, 50, two 46, 50 are attached in cantilevered fashion to the second end member 14, and the center unwind shaft 48 is attached in cantilever fashion to the first end member 12. A clamp 52 is attached to the free end of each of the five cantilever mounted unwind shafts 36, 38, 46, 48, 50 to position the free end of each unwind shaft when the machine 10 is in use.

Figure 5:
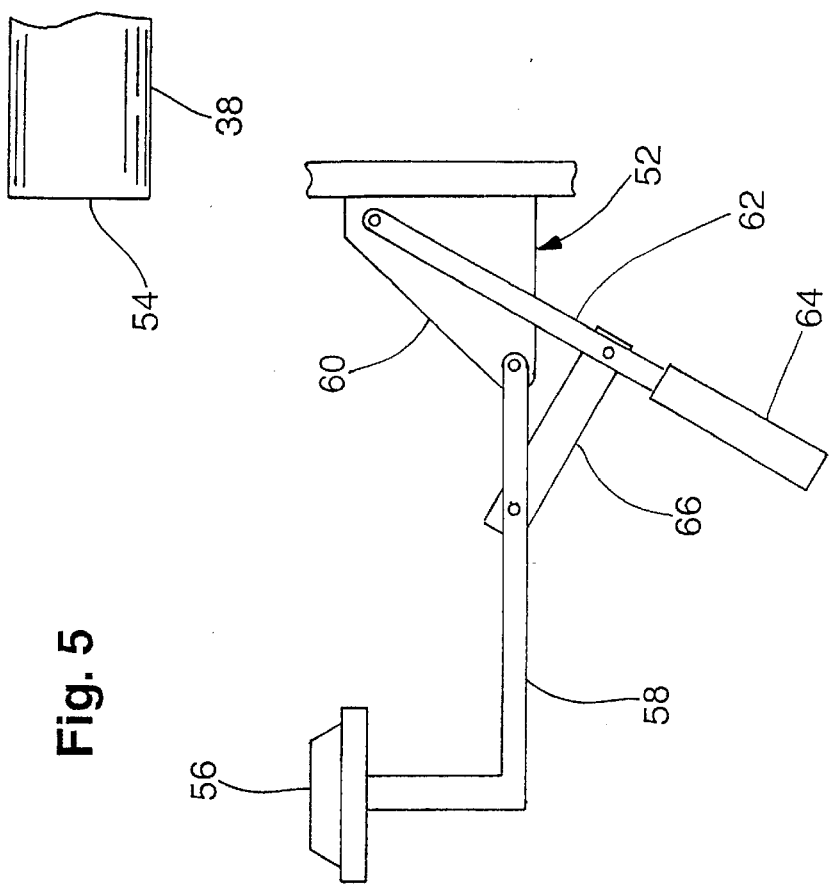
FIG. 5 is a second enlarged view of a clamp withdrawn from the free end of a cantilever unwind shaft on the machine shown FIG. 1.
Figure 4:
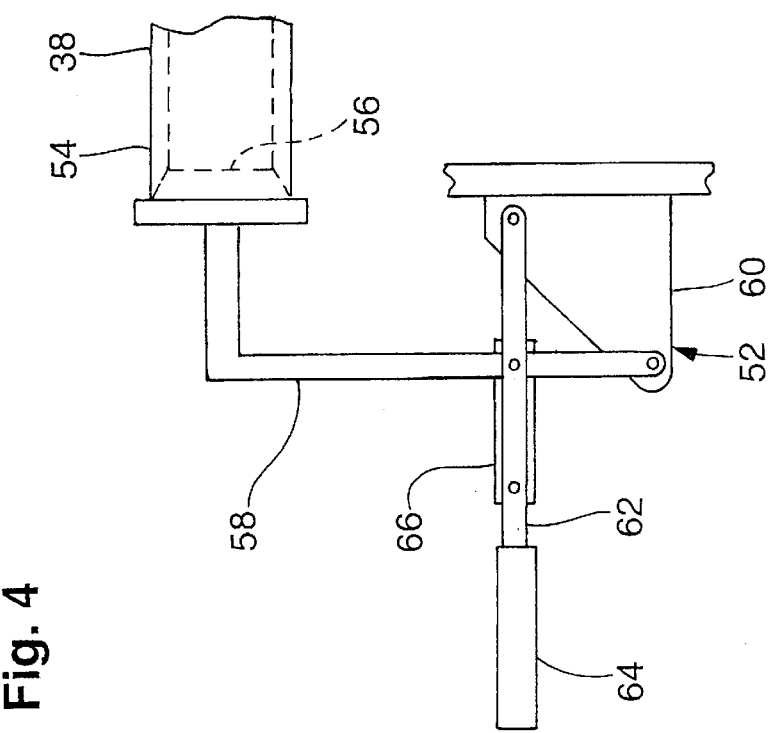
FIG. 4 is an enlarged view of a clamp fitted to the free end of a cantilever unwind shaft on the laminating machine shown in FIG. 1.

Referring to FIG. 4 and FIG. 5 the free end 54 of unwind shaft 38 is depicted as being typical of all five of the unwind shafts. The clamp 52 includes a plug 56 adapted to fit partially within the center of the free end 54 of unwind shaft 38. The plug 56 is attached to a first lever arm 58 which is pivotally mounted at its inner end to a bracket 60. As can be seen in FIGS. 4 and 5, the plug 56 and the first lever arm 58 can be locked against the free end 54 of the unwind shaft 38 by use of a second lever arm 62 having a handle 64 at the end thereof, or may be pulled away from the free end 54 of the shaft 38 by a linkage bar 66 extending between the second lever arm 62 and the first lever arm 58. When the handle 64, linkage bar 66, and lever arms 58, 62 are moved to draw the plug 56 away from the free end 54 of the unwind shaft 38, there is sufficient room around the circumference of the unwind shaft 38 to permit a full roll of laminating material 40, having a diameter of approximately one foot to be slid over the unwind shaft 38. Thereafter, the plug 56 of the clamp 52 can be reinserted into the free end 545 and locked into place with the handle 64 and lever arms 58, 62.

In FIGS. 1 and 2, unwind shafts 36, 38, 46 and 48 are depicted as having a roll of laminating material 40 fitted thereon, whereas unwind shaft 50 is depicted as not having a roll of material fitted thereon. The roll of material 40 is positioned onto the center unwind shaft 48 by sliding it through a hole 67 in the second end member 14. Cut outs, not shown, in the first end member 12 permit the loading of a roll 40 on shafts 46 and 50. To prevent longitudinal movement of the roll of laminated material 40 along an unwind shaft 36, 38, 46, 48, 50, of which shaft 38 is typical, a clamp 68 is fitted around the unwind shaft 38 against which one end of a roll of material 40 can be positioned. The clamp 68 is of the type well known in the art having a body which fits around the diameter of the shaft 38 and has a pair of free ends which are tightened together by a threaded screw to thereby lock the clamp to the shaft 38.

Figure 7:
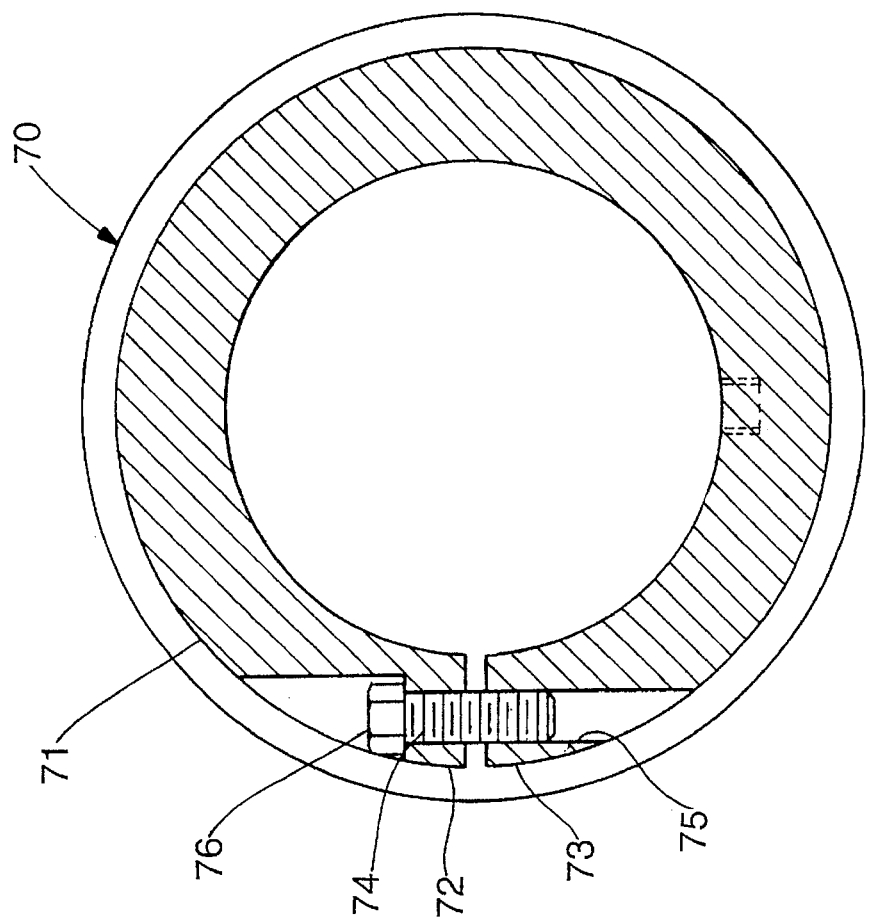
FIG. 7 is a second enlarged cross sectional view of the brake in FIG. 6 taken through lines 7—7 thereof.
Figure 6:
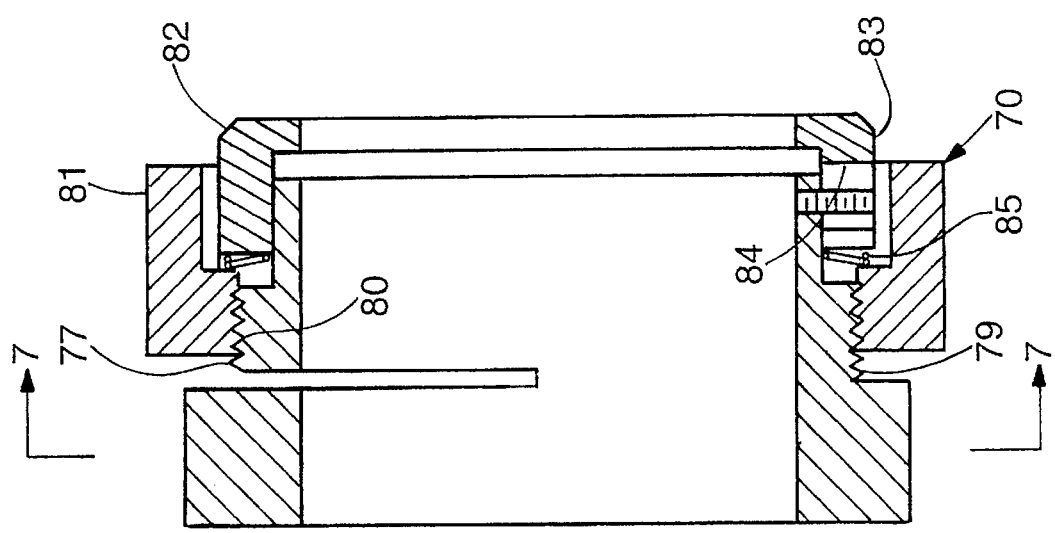
FIG. 6 is an enlarged cross sectional view of a brake such as is fitted on an unwind shaft of the machine in FIG. 1.

On the opposite end of the roll of laminate material 40, a brake 70, in accordance with the present invention is attached to the shaft 38. As can be seen in FIGS. 6 and 7, the brake 70 also includes a clamp portion 71 which substantially surrounds the diameter of the unwind shaft 38 except for a narrow space. Each of the spaced apart ends 72, 73 of the clamp portion 71 has a bore 74, 75 respectively therein which are aligned axially. The bore 75 in end 73 is threaded and the bore 74 in the end 72 is counterbored such that a threaded bolt 76 can be inserted in the bore 74 in end 72 and threaded into complimentary threads in the bore 75 in the other end 73. When the bolt 76 is tightened the clamp 72 will retain the brake 70 on the unwind shaft 38.

The brake 70 further includes an inner sleeve 77 which is joined to the clamp 71 along one half of the circumference of the inner sleeve 77 as is shown in FIG. 6. The inner sleeve 77 has outer threads 79 which engage complementary inner threads 80 on an outer locking collar 81. The distal end of the outer locking collar 81 abuts against a third brake collar 82. Rotation of the locking collar 81 will move the locking collar 81 axially along the threads 79 of the inner sleeve 77 and compress the brake collar 82 against the end of a roll of laminating material 40. A set screw 83 in the inner sleeve 77 extends radially outwardly of the surface of the inner sleeve 77 and fits within a longitudinal slot 84 in the brake collar 82 to prevent rotation of the brake collar 82 relative to the inner sleeve 77. Also, a spring 85 positioned between the inner sleeve 77 and the brake collar 82 is biased to exert a longitudinal force to urge the brake collar 82 away from the inner sleeve 77.

When the brake 70 is fitted against the end of a roll of laminating material 40, and the locking collar 81 rotated such that the brake collar 81 is compressed against the end of a roll of material 40 which has a clamp 52 at the other end thereof, the roll of laminating material 40 will not freely spin around the shaft 38. The laminating material on the roll 40 will be drawn off the roll 40 at an even rate by the pull of the other rollers of the machine upon the free end of the laminating material as it unwinds from the roll 40.

To maintain the temperature of the first and second heated rollers 18, 20, a pair of infrared heat sensing devices 83, 84 are mounted to the second end member 14. The first heat sensing device 83 is aimed near the center of the first heat roller 18 and the second infrared heat sensing device 84 is aimed toward the center of the second heated roller 20. Each of the heat sensing devices 82, 84 is capable of reading the temperature of the roller within 3 to 4 degrees F. and the output from the heat sensing devices 83, 84 are directed to a control mechanism 86 of the machine. The temperatures of the first and second rollers are displayed on numerical readouts 87, 88, respectively. The control mechanism 86 also actuates the heating elements 26, 28 positioned within the first and second rollers 18, 20, respectively, as needed to maintain the desired temperature of each of the rollers 18, 20. Such temperature regulating mechanisms are well known in the art.

Across the front 90 of the machine 10 and parallel with the nip between the first and second heated rollers 18, 20, is a front table 92. Printed material which is to be laminated is positioned on the table and fed into the nip of the first and second heated rollers 18, 20 to apply a lamination thereto.

Figure 8:
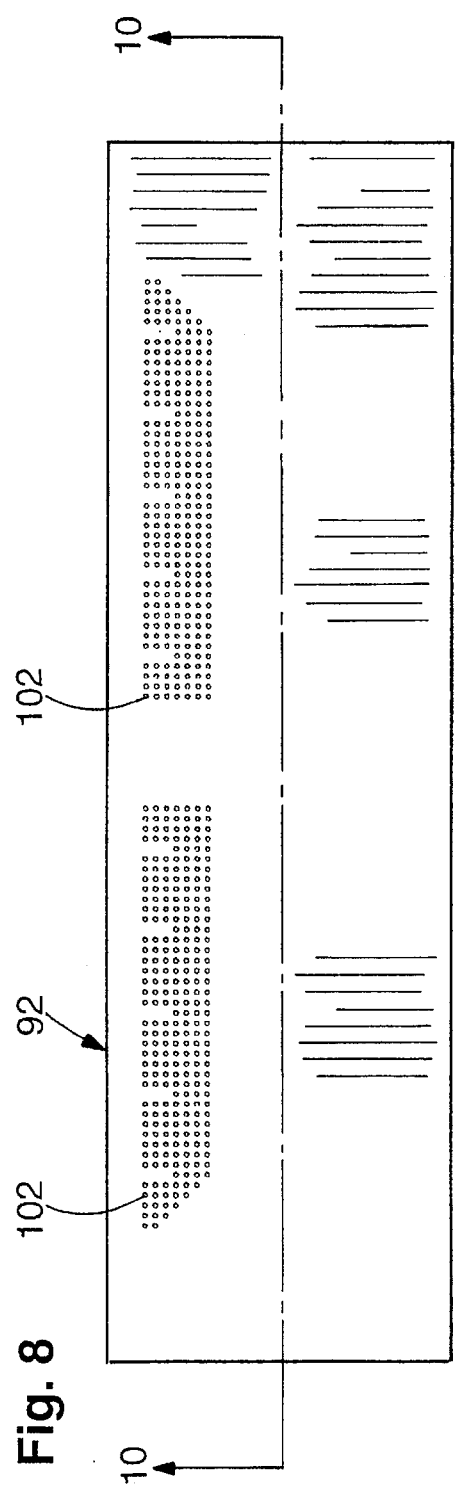
FIG. 8 is a top view of the front table of the laminating machine shown in FIG. 1.
Figure 9:
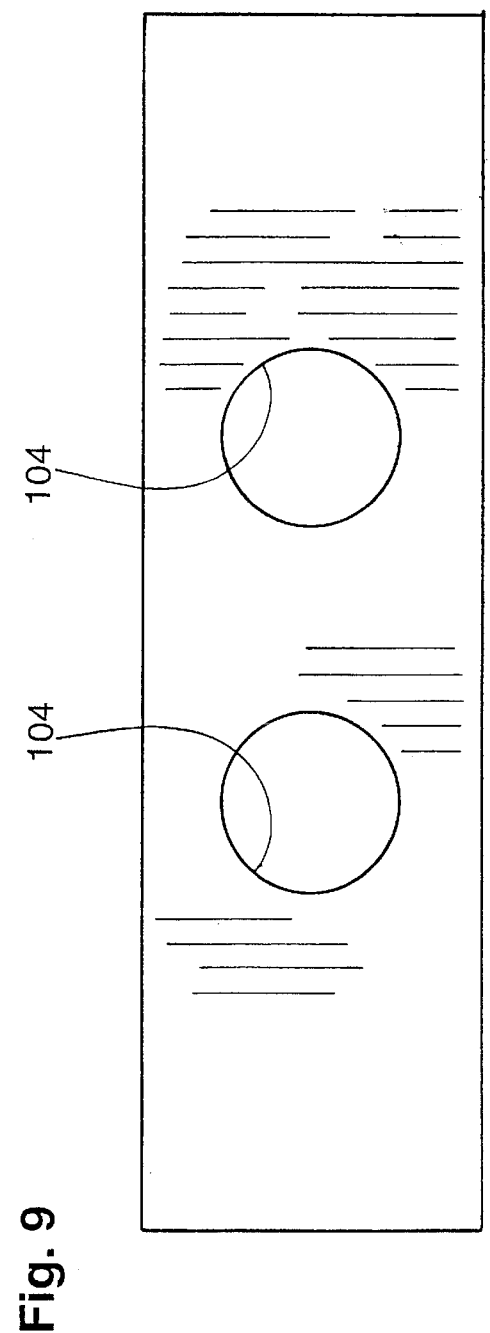
FIG. 9 is a bottom view of the front table shown in FIG. 8.

Referring to FIGS. 8, 9 and 10, the front table 92 has an upper planar section 94 and a lower planar section 96 separated from the upper planar section such that the interior of the front table 92 is hollow. A peripheral edge 100 extends around the four sides of the table 92 and seals the edges of the upper and lower sections 92, 96. As shown in FIG. 8, the upper section 94 has a plurality of perforations 102 forming a pattern along the length of the front table 92. The lower section 96 has a plurality of circular holes 104 and across the opening of each hole 104 a fan 106 is positioned which has an outer diameter equal to the diameter of the hole 104. The fans 106 are oriented such that they will draw air through the perforated holes 102, through the space between the upper and lower sections 94, 96 and out through the holes 104 causing a vacuum to be created at the upper surface of the table 92. When the table 92 is positioned as shown in FIG. 2 adjacent the nip between the first and second heated rollers 18, 20, a print placed upon the table 92 will be drawn by the vacuum towards the table 92 and lie flat thereon as it is being fed into the nip of the rollers 18, 20. As a result, curling and creasing of the print and the lamination of the print with the creases therein will be avoided.

As can be seen in FIG. 2, at the rear of the machine 10 are upper and lower parallel horizontal pull rollers 108, 110 and behind the upper and lower pull rollers 108, 110 is a rear table 112. The rear table 112 is positioned parallel to the axis of the pull rollers 108, 110 such that material exiting the first and second heated rollers 18, 20 will pass over a short middle table 113, then pass between the pull rollers 108, 110 and pass across the rear table 112.

As shown in FIG. 2, a pair of fan banks, 115a, 115b, each of which includes a plurality of fans in side by side relationship, not shown, are positioned one above and one below the laminated material emanating from the nip of the first and second heated rollers 18, 20. The fans 115 cool heat activated laminate material such that the adhesive is dried before the laminated material passes through the pull rollers 108, 110 and is rolled onto a spool, not shown.

Referring to FIG. 2, fitted across the front 90 of the machine 10, and positioned in front of the front table 92, is a horizontal easel shaft 114 in accordance with the present invention. The easel shaft 114 is supported by a pair of arms 116, 118, the first arm 116 extending horizontally from the first end member 12 and the second arm 118 extending horizontally from the second end member 16. Extending vertically from the distal end of the first arm 116 is a cylindrical peg 120 and extending vertically from the distal end of the second arm 118 is a second cylindrical peg 122. As can be seen in FIGS. 1 and 11, the first vertical peg 120 is substantially longer than the second vertical peg 122. The easel shaft 114 is tubular and has transverse holes 119, 121 at each end thereof, and each hole 123, 119, 121 has a diameter a little larger than the diameter of the first and second cylindrical pegs 120, 122. The transverse holes 119, 121 at the distal ends of the easel shaft 114 are spaced apart a distance equal to the distance between the vertical pegs 120, 122, such that the easel shaft 114 may be positioned over the pegs 120, 122 and held in place. The easel shaft 114 will retain a roll of print material positioned on the shaft 114 which can be positioned between a clamp 68 and a brake 70 to insure the even unwinding of the print material. The free end of the roll of print material, not shown, may be fed across front table 92 and into the nip between the first and second rollers 18, 20. To unload or load a roll of print material on the easel shaft 114, the shaft 114 need only be lifted upwardly sufficiently high to remove the end of the shaft 114 fitted over the short peg 122, and thereafter the easel shaft 114 can be pivoted about the first vertical peg 120. The shaft 114 will be retained on the first peg 120 in a cantilevered orientation while a roll of print material is loaded or unloaded. After loading or unloading, the free end of the easel shaft 114 can be repositioned over the short cylindrical peg 122.

As can be seen in FIG. 1, the laminating machine 10 has a front control panel 128 which is readily accessible when the machine 10 is operated from the front 90. The panel 128 includes temperature readouts 87, 88 for the first and second heated rollers 18, 20 as previously stated, and controls for operating the cylinders 30, 31 which raise and lower the second heated roll 20. The front control panel 128 also has controls for a second set of compressed air cylinders 123, 124 from which rods 125, 126, respectively extend, each of which is connected to a different end of the upper pull roller 108. The ends of the upper pull roller 108 slide vertically in tracks, one of which 127 is shown, and the second set of cylinders 123, 124 raise and lower the upper pull roller 108 within the tracks 127. The panel further includes controls for operating a motor 129 connected to a chain drive, not shown, which rotates the first heated roller 20 and the lower pull roller 110. The chain drive is adapted to turn the lower heated roller 18 and the lower pull roller 110 at rates such that the surfaces thereof move at the same speed and material fed into the nip between the heated rollers 18, 20 will be drawn at the same speed through the pull rollers 108, 110. Finally, the front control panel 128 includes controls to direct the motor 129 for forward rotation, backward rotation, or stopped. A foot pedal 130 can also be used to start or stop the motor 129 or operate the motor 129 either in a forward or a backward direction.

Referring to FIG. 3, the laminating machine 10 also includes a rear control panel 132 which is accessible from the back 133 of the machine 10. The rear control panel 132 is not provided with temperature readouts 87, 88 as is provided in the front control panel 128, but all other controls relating to the machine 10 provided on the front control panel 128 are duplicated on the rear control panel 132. There is also provided a second foot pedal, not shown which is usable to control the operation of the motor 129 in the same fashion as the front foot pedal 130.

Figure 13:
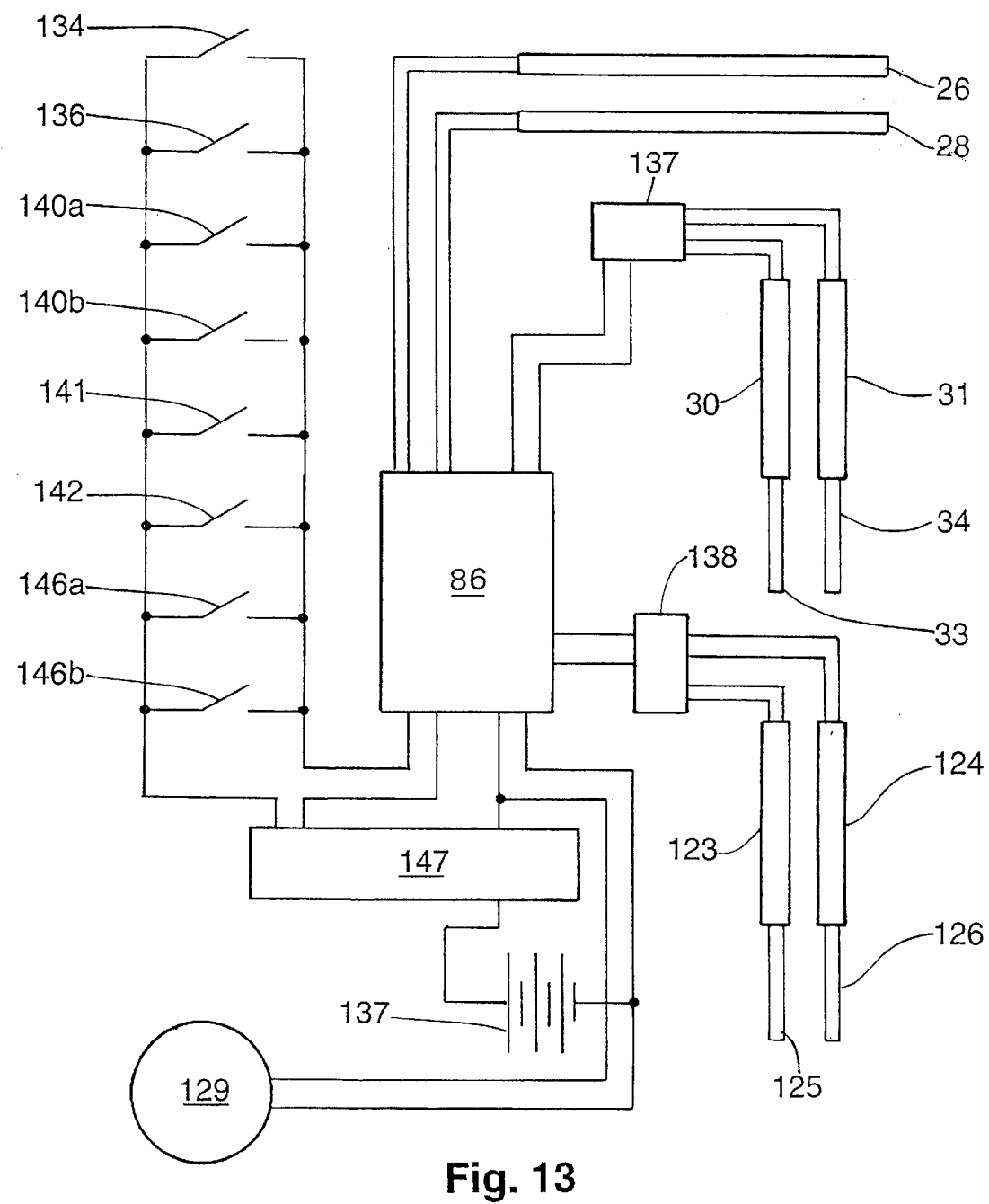
FIG. 13 is a schematic diagram of a circuit for the safety turn off switches on the machine shown in FIG. 1.

As shown in FIG. 1, there is also provided on the front 90 of the machine 10 two safety turn off switches 134, 136, one positioned at each end of the front 90 of the machine 10. As shown in FIG. 13, the safety turn off switches 134, 136 are wired to interrupt power from a source 137 to the motor 129, and to operate the control valves 138, 139 to direct air into one side of cylinders 30, 31 and one side of cylinders 123, 124 to retract the rods 125, 126, and lift the second heated roller 20 into the raised position and lift the upper pull roller 108 into the raised position. Furthermore, actuation of the safety turn off switch 134, 136 also interrupts power to the heating elements 26, 28 positioned within the first and second heated rollers 18, 20. As a result, if an operator has his clothing or his hand caught within the nip of the machine 10, he may touch either of the safety turn off switches 134, 136 and turn off the machine 10, including the heat to the heating elements 26, 28 and separate the first and second heated rollers 18, 20 and the upper and lower pull rollers 108, 110.

There is also provided a safety turn off bar 140 which extends along the front 90 of the machine 10 just above the casters 15 from the first end member 12 to the second end member 14. The ends of the safety turn off bar 140 are attached to pressure sensitive switches, 140a, 40b, which will be actuated by any downward pressure on the turn off bar 140. The safety control features which are activated by the safety turn off switches 134, 136 are also actuated by the switches 140a, 140b connected to the safety turn off bar 140.

Referring to FIG. 3, a pair of safety turn off switches 141, 142 are also provided on the back side 133 of the machine 10. One safety turn off switch 141, 142 is positioned at each of the ends of the back side 133 of the machine 10. Also, there is a safety turn off bar 146 positioned along the bottom of the back 133 of the machine 10 extending from the first end member 12 to the second end member 14, the ends of which are connected to switches 146a, 146b which are similar to that found on the front 90 of the machine 10. As shown in FIG. 13, the safety turn off devices 141, 142, 146 on the back 133 of the machine 10 are wired in parallel with the safety turn off devices 134, 136, 138 on the front 90 of the machine 10 to activate a relay 147 affecting all the above functions. An operator can readily reach a turn off switch from any position around the machine and thereby shut down all the functions of the machine 10.

As can be seen, a substantial portion of the machine 10 consists of tubular shafts which extend from the first end section 12 to the second end section 14. To minimize the weight of the machine, and yet provide more strength than a tubular metal shaft, all the unwind shafts 36, 38, 46, 48, 50, the easel shaft 114, the upper and lower pull rollers 108, 110 and the tie bars 16—16 are all made of extruded aluminum. FIG. 12 depicts a cross section of the easel shaft 114, but the webbing shown for the easel shaft 114 is substantially similar to that provided in all the foregoing shafts and rollers. Referring to FIG. 12, a longitudinal webbing 148 is extruded into the center of the easel shaft 114. The webbing 148 includes a plurality of planar veins 150a, 150b, 150c, 150d, 150e and 150f extending radially outwardly from a central tubular center 152.

The machine 10 can be operated to perform a number of functions including applying laminating material to a roll of print material. To perform this function, a roll of print material, not shown, is slid onto the easel shaft 114 and the shaft 114 positioned between the vertical pegs 120, 122. A roll of laminating material 40 is positioned onto one of the two upper cantilever unwind shafts 36, 38, Such as shaft 38, as shown in FIG. 1 and positioned between a clamp 68 and a brake 70. Thereafter, the free end of laminating material from the roll 40 may be positioned around one of the idler tie bars 16a and onto the upper surface of the upper heated roll 20. Similarly, a second roll of laminate material 40 can be fitted upon one of the lower cantilever unwind shafts such as shaft 48 and the free end passed around another idler tie bar 16b to the underside of the first heated roller 18. If one or both of the rolls of laminate materials 40 are heat activated, the heating element 26, 28 in the roller 18, 20 receiving a heat activated material should be actuated. Thereafter the associated heat sensing devices 82, 84 will monitor the temperature of rollers 18, 20 and the control mechanism 86 will actuate the heating elements 26, 28 as needed to maintain the desired temperature.

The leading edge of print material from a roll positioned on the easel shaft may then be fed across the front table 92, into the nip between the first and second heated rollers 18, 20 across a middle table 113 to the upper and lower pull rollers 108, 110. The machine 10 can then operate with a minimum of attention and will apply the rolls 40 of laminate material to the top and bottom of a roll of print material positioned on the easel shaft 114. The output of laminated material will pass across the rear table 112 and can be rolled onto a spool positioned at the back of the machine 10.

When a spool of laminating material on one of the unwind shafts, such as shaft 38 shown in FIG. 2, is exhausted, a new spool on an adjacent unwind shaft, such as shaft 36, may be easily fed into the machine 10. The machine 10 can be momentarily stopped and the free end of the new roll of material threaded around an idler shaft 16a and across the second heated roller 20. Thereafter, the machine can be turned on. A similar procedure may be followed when a roll of material feeding the first heated roller 18 becomes exhausted.

With the easel shaft 114 removed, the machine 10 can be used to laminate smaller print material or mount print material on a mounting board of the thickness desired.

Shims, not shown, may be positioned around the upper ends of the rods 33, 34 extending from the cylinders 32, 34 and around the upper ends of the rods 125, 126 extending from the second cylinders 123, 124 to provide the desired separation between the first and second heated rollers 18, 20 and the upper and lower pull rollers 108, 110.

When the machine is in use to apply heat activated laminate to a material, the heated rollers 18, 20 will be at a temperature of approximately 200 degrees F. After applying a laminate to a print, it may be desirable to press the laminated print onto a board of material to provide a backing. Normally, the main rollers 18, 20 of a laminating machine 10 can be used to press a print onto a backing. The heated rollers 18, 20 cannot, however, be used to perform this task immediately after they have been used to apply heat activated laminate material because the heat of the rollers will damage the backing or the recently applied laminate material to the front of the print. It is generally necessary to permit the heated rollers 18, 20 to cool, and there may be extended periods of time during which the machine cannot be utilized. In the present invention, the upper and lower pull rollers 108, 110 may be used to compress a print onto a backing while the first and second heated rollers 18, 20 remain at operating temperature for heat actuated laminate material. To apply print material to a backing using the pull rollers 108, 110, the operator uses the rear control panel 132 and places the print material and backing upon the rear table 112. Thereafter, the machine 10 can be operated in reverse direction and the print material and backing may be fed into the nip of the pull rollers 108, 110.

There is therefore disclosed a laminating machine 10 which can be easily loaded with a roll of laminating material 40 and can laminate an entire roll of print material with a minimum of attention from an operator. Furthermore, the laminating machine of the present invention incorporates safety features which will enable an operator to escape from serious injury. Furthermore, the machine can provide a number of functions not previously rendered available on existing laminating machines.

While the present invention has been described in connection with one embodiment, it will be apparent to those skilled in the art that many modifications and changes thereto can be made without departing from the true spirit and scope of the invention. Therefore it is intended by the appended claims to cover all such changes and modifications which come within the true spirit and scope of the invention.

What is claimed is:

1. In a laminating machine having a plurality of longitudinal shafts each of said shafts having a long axis and the axes of all such shafts being in parallel alignment, the improvement comprising:

one of said shafts having a hollow interior and being open at each end, and made of extruded aluminum, said one of said shafts having:
 (a) continuous outer and inner cylindrical surface portions, said outer surface portion having a substantially uniform outer diameter;
 (b) an inner core member; and
 (c) an extruded aluminum webbing formed with the inner cylindrical surface portions and the inner core member, the webbing including a plurality of planar veins extending radially outward from the inner core member to the inner cylindrical surface portion of the shaft and extending longitudinally substantially the entire length of the shaft.

2. In a laminating machine having the improvement in accordance with claim 1 wherein said inner core member has an axial bore extending therethrough.

3. A shaft for use in a laminating machine, the shaft comprising:

an open-ended tubular body having a substantially uniform outer diameter, said body being made of extruded aluminum;

an extruded aluminum inner core member; and an extruded aluminum webbing located within the tubular body, the webbing including a plurality of planar veins extending radially outwardly from the inner core member to the interior surface of the tubular body and extending longitudinally substantially the entire length of the tubular body said tubular body, inner core member and webbing being integrally formed.

4. The shaft of claim 3 wherein the planar veins support the tubular body.

5. The shaft of claim 3 wherein the planar veins are spaced at equiangular intervals.

6. The shaft of claim 3 wherein the webbing includes a substantially tubular center portion having a diameter less than the tubular body and located substantially coaxial with the tubular body.

* * * * *